United States Patent
Itomi

(10) Patent No.: US 8,589,117 B2
(45) Date of Patent: Nov. 19, 2013

(54) ROTATION ANGLE DETECTING UNIT

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 364 days.

(21) Appl. No.: 13/058,344

(22) PCT Filed: Sep. 8, 2009

(86) PCT No.: PCT/JP2009/065656
§ 371 (c)(1),
(2), (4) Date: Feb. 10, 2011

(87) PCT Pub. No.: WO2010/029916
PCT Pub. Date: Mar. 18, 2010

(65) Prior Publication Data
US 2011/0137609 A1    Jun. 9, 2011

(30) Foreign Application Priority Data
Sep. 12, 2008   (JP) .................................. 2008 235132

(51) Int. Cl.
*G01B 7/30*         (2006.01)
(52) U.S. Cl.
USPC ......................................................... 702/151
(58) Field of Classification Search
USPC ......................................................... 702/151
See application file for complete search history.

(56) References Cited

U.S. PATENT DOCUMENTS

| 8,368,389 B2 * | 2/2013 | Itomi ....................... 324/207.12 |
| 2008/0187361 A1 | 8/2008 | Sakagawa et al. |

FOREIGN PATENT DOCUMENTS

| JP | 9-105604 | 4/1997 |
| JP | 11-344302 | 12/1999 |
| JP | 2004-191101 | 7/2004 |
| JP | 2007-240444 | 9/2007 |
| JP | 2008-191246 | 8/2008 |

OTHER PUBLICATIONS

International Search Report issued Nov. 10, 2009 in International (PCT) Application No. PCT/JP2009/065656.

* cited by examiner

*Primary Examiner* — Tung S Lau
(74) *Attorney, Agent, or Firm* — Wenderoth, Lind & Ponack, L.L.P.

(57) ABSTRACT

A shaft and rolling bearings are mounted in the housing. A magnetic sensor is fixed to a first end surface of a shaft. A circuit board carrying a magnetic sensor is fixed to a surface of a lid of the housing at the second end. As a calibration voltage feed line, a cable is connected to the circuit board and extends outside through a hole formed through the lid. With the lid fixed in position, thereby applying a preload to rolling bearings, calibration voltage is supplied to the magnetic sensor through the calibration voltage feed line, thereby writing initial calibration parameters into the magnetic sensor from an external calibration device. After writing the parameters, the calibration voltage feed line is connected, at the outside, to a stabilizing output end of a power source input/output board fixed to the surface of the lid at the first end.

20 Claims, 5 Drawing Sheets

ROTATION ANGLE DETECTING UNIT

TECHNICAL FIELD

This invention relates to a rotation angle detecting unit for detecting the relative rotation angle between members, and particularly a non-contact type one which can detect the rotation angle of a shaft of a machine such as a construction machine or an industrial machine with loads applied to the shaft.

BACKGROUND ART

A known rotation angle detecting unit rotatably supports a shaft on a housing through a rolling bearing, and includes a magnetic rotation angle sensor mounted in the housing. The magnetic rotation angle sensor comprises a magnetic drum fixed to one end surface of the shaft, and a magnetic sensor for detecting a change in magnetic flux as the magnetic drum rotates and calculating the relative rotation angle. This type of rotation angle detecting unit is used with the shaft coupled to one of the mating members such as a rotary shaft and a sensor case mounted to the other mating member.

Assembling errors are unavoidable between the respective ones of the rotation angle sensor, circuit board, shaft and housing. Thus some of today's magnetic sensors have the function of correcting the measured value based on initial calibration parameters stored for correcting measurement errors resulting from assembling errors. In order to specify the initial calibration parameters, it is necessary to perform actual measurements. Thus, output signals from the magnetic sensor are transmitted to an external calibration device to calculate initial calibration parameters in the external calibration device, and the thus calculated initial calibration parameters are written into nonvolatile semiconductor memory of the magnetic sensor (as disclosed in JP Patent Publication 2004-191101A). Among them, there is known the type in which an external calibration device is connected to the sensor power source connecting end, grounded end and signal output ends of the circuit board carrying the magnetic sensor, and the initial calibration parameters are written while supplying a calibration voltage, which is higher than ordinary use voltage, through the sensor power source connecting end. With this magnetic sensor, since the calibration voltage and the use voltage are both supplied through the sensor power source connecting end, it is not necessary to provide the circuit board with a power source connecting end for calibration, which makes it possible to reduce the size of the circuit board and to simplify its structure.

When, as described above, use voltage and calibration voltage are supplied to the magnetic sensor through the common sensor power source connecting end, it is impossible to mount a voltage stabilizing circuit between the input end of the magnetic sensor and the sensor power source connecting end, because it becomes impossible to supply calibration voltage to the input end of the magnetic sensor. If the voltage stabilizing circuit is not mounted, if the power source voltage supplied is unstable according to the use environment, such as in the case in which the generator of e.g. a construction machine or an industrial machine is used as the external power source, or if the power source voltage supplied cannot be determined to be one, it is difficult to use the rotation angle detecting unit.

Therefore the applicant proposed (in JP Patent Application 2007-23178) a rotation angle detecting unit which comprises a housing including a housing body having mounting openings at first and second ends thereof, respectively, and a lid covering the mounting opening at the first end, a shaft having its portion at the first end received in the housing and its portion at the second end protruding from the mounting opening of the housing at the second end, a rolling bearing rotatably supporting the shaft on the housing body, a magnetic drum fixed to an end surface of the shaft at the first end, and a circuit board carrying a magnetic sensor having the above-described correcting function, wherein a board internal mounting portion is provided on a surface of the lid at the second end for mounting the circuit board, wherein the lid is configured to apply a preload to the rolling bearing by pressing an outer race of the rolling bearing and to position the magnetic sensor relative to the magnetic drum when the lid is fixed in position, wherein a voltage stabilizing circuit for stabilizing and outputting use voltage and a wiring are provided parallel to each other between the input end of the magnetic sensor and the sensor power source connecting end of the circuit board, and a switching portion is provided which can disconnect the wiring, and wherein an operating port is formed in the housing through which the switching portion is accessible for disconnection.

With this rotation angle detecting unit, it is possible to supply calibration voltage to the input end of the sensor through the sensor power source connecting end of the circuit board and the parallel connected wiring. By disconnecting the wiring after writing the initial calibration parameters, it is possible to supply use voltage to the input end of the sensor through the voltage stabilizing circuit. Also, with this rotation angle detecting unit, by pushing the outer race of the rolling bearing with the lid and applying a preload to the bearing, the rigidity of the bearing increases. This prevents displacement of the shaft due to loads applied thereto and shifting between the magnetic drum and the magnetic sensor. Thus it is possible to detect the rotation angle in an optimum manner with the shaft coupled to the above-described rotary shaft and loads applied to the rotary shaft. Since the lid is used, it is not necessary to provide a dedicated cover for mounting the circuit board. The initial calibration parameters can be determined by fixing the lid.

But if the voltage difference between the input voltage value and output voltage value to and from the to the voltage stabilizing circuit (use voltage values) is large, it is necessary to use large-sized power source stabilizing element and resistor have to be used due to generated calorie. The magnetic gap between the magnetic sensor and the magnetic drum is extremely small in size compared to the power source stabilizing element. Thus, if the power source stabilizing element is mounted on the same side as the magnetic sensor, the power source stabilizing element cannot be fitted between the end surface of the shaft at the first end and the circuit board. If the power source stabilizing element is displaced from the end surface of the shaft at the first end, it can be mounted in position. But this increases the outer circumferential length of the circuit board, thus increasing the diameter of the lid and thus the size of the unit. Even if the above-mentioned voltage difference is small, if the power source stabilizing element and the like are mounted on the surface of the circuit board at the second end, since an increased number of electronic parts are mounted on this side, the area of the circuit board increases, thus increasing the diameter of the lid.

If the magnetic sensor is mounted on the surface of the circuit board at the second end and the voltage stabilizing circuit is mounted on the surface of the circuit board at the first end, the unit can be made compact in size. But in this case, the contact area between the circuit board and the surface of the lid at the second end decreases, thus making it difficult to stably mount the circuit board.

SUMMARY OF THE INVENTION

An object of the present invention is to make it possible to stably supply use voltage after writing the initial calibration parameters into the magnetic sensor, while stably supporting the circuit board and keeping the size of the rotation angle detecting sensor to a minimum.

In order to achieve this object, the present invention provides a rotation angle detecting unit comprising a housing including a housing body having mounting openings at first and second ends thereof, respectively, and a lid covering the mounting opening at the first end, a shaft having its portion at the first end received in the housing and its portion at the second end protruding from the mounting opening of the housing at the second end, a rolling bearing rotatably supporting the shaft on the housing body, a magnetic drum fixed to an end surface of the shaft at the first end, a magnetic sensor for detecting change in magnetic flux as the magnetic drum rotates, and calculating a relative rotation angle based on the change in magnetic flux, and a circuit board carrying the magnetic sensor, wherein a board internal mounting portion is provided on a surface of the lid at the second end for mounting the circuit board, wherein the lid is configured to apply a preload to the rolling bearing by pressing an outer race of the rolling bearing and to position the magnetic sensor relative to the magnetic drum when the lid is fixed in position, wherein initial calibration parameters are configured to be written into the magnetic sensor while calibration voltage which is higher than use voltage is being supplied through a sensor power source connecting end of the circuit board, wherein a board external mounting portion is provided outside the housing to which a power source input/output board with a stabilizing circuit for stably outputting use voltage can be mounted, the rotation angle detecting unit further comprising a calibration voltage feed line extending from the sensor power source connecting end to the outside with the lid fixed in position, the calibration voltage feed line having an external connecting end which can be connected to a stabilizing output end of the power source input/output board after the initial calibration parameters have been written.

As used herein, "use voltage" refers to a voltage which allows measurement with the magnetic sensor. The voltage stabilizing circuit has to be capable of stabilizing the voltage supplied from an external power source within such a range and outputting it. The calibration voltage is higher than the use voltage and is used when writing the initial calibration parameters into a nonvolatile memory of the magnetic sensor from an external calibration device. The initial calibration parameters are parameters of transfer functions for the magnetic sensor to correct measurement errors originating from assembling errors of the shaft, rolling bearing, housing, magnetic drum, magnetic sensor and circuit board.

With the arrangement of the present invention, with the lid fixed in position, it is possible to write the initial calibration parameters by supplying calibration voltage to the sensor power source connecting end of the circuit board from outside through the calibration voltage feed line. Then, by connecting the external connecting end of the calibration voltage feed line and the stabilizing output end of the power source input/output board at the outside, it is possible to stably supply use voltage, which is lower than the calibration voltage, to the sensor power source connecting end through the calibration voltage feed line, after writing the initial calibration parameters. Since the power source input/output board is mounted to the board external mounting portion, which is provided outside the housing, the circuit board carries its component parts only on one side thereof, which makes it possible to minimize the area and the circumferential length of the circuit board. This in turn makes it possible to stably mount the circuit board and minimize the diameter of the lid and thus the size of the entire rotation angle detecting unit.

Preferably, the calibration voltage feed line comprises a cable extending through a through hole formed in the lid, and the board external mounting portion is provided on the surface of the lid at the first end.

With this arrangement, the calibration voltage feed line can be provided simply by connecting the calibration feed line comprising a cable to the circuit board and passing the cable through the through hole when mounting the circuit board.

The calibration voltage feed line may be provided by passing a connector having an internal connecting end protruding from the second end of the lid and an external connecting end protruding from the first end of the lid through the lid. If the lid is made of an insulating resin, the calibration voltage feed line may be formed by insert molding.

Preferably, the housing has a mounting surface at the first end which is configured to be clamped against a mating member, the board external mounting portion is located radially inwardly of the mounting surface and recessed from the mounting surface toward the second end, and the through hole is formed in the recess of the board external mounting portion, whereby the board external mounting is closed when the mounting surface is clamped against the mating member, except a cable port extending from the board external mounting portion to the outside.

By providing the mounting surface at the first end of the housing which is configured to be clamped against the mating member, it is possible to provide the board external mounting portion on the surface of the lid at the first end so as to be located radially inwardly of the mounting surface and recessed toward the second end. By clamping the mounting surface against the mating member, the board external mounting portion can be closed by the mounting surface and the mating member. By mounting the power source input/output board and the magnetic sensor in the board external mounting portion and forming the through hole, e.g. the power source input/output board can be protected from outside without separately providing a dedicated cover. The reason why the cable port is not closed is because it is necessary to pass an input line for supplying voltage from an external power source to the input end of the power source input/output board and signal lines connected to the circuit board and the power source input/output board to the outside when mounting to the mating member after writing the initial calibration parameters.

The cable port may be separately closed by resin or a seal. If the board external mounting portion and the through hole are coated with resin, the cable port may not be closed.

Preferably, the power source input/output board can be mounted to the board external mounting portion at its part displaced from the through hole.

With this arrangement, it is possible to connect the external connecting end of the cable to the stabilizing output end with the power source input/output board mounted to the board external mounting portion beforehand. This eliminates the necessity to connect the cable with the power source input/output board held in the air, and also the cable is never in the way during assembling. Further, it is possible to close the through hole with a resin or a seal after mounting the power source input/output board.

In particular, the live part of the circuit board and the through hole are preferably protected by the same resin coating layer. With this arrangement, it is not necessary to coat the through hole with resin beforehand, and the live part of the circuit board and the through hole can be protected simultaneously with the same resin coating.

The live part of the circuit board may also be coated with resin.

Preferably, the live part of the circuit board and the live part of the power source input/output board are each coated with at least one of silicon resin, urethane resin and epoxy resin.

The interior of the housing is ordinarily sealed from outside. Thus, a resin is preferably used for the circuit board that is more vibration-resistant than water-resistant and weather-resistant. For example, the circuit board is preferably coated with silicon resin or urethane resin (particularly foamed urethane resin). Since such resin coating in the housing is less likely to crack and is durable, it is possible to avoid maintenance by disassembling and thus avoid the necessity to perform initial calibration again. This resin for the power source input/output board, which is mounted outside the housing, is preferably one which is sufficiently water-resistant and weather-resistant, such as urethane resin or epoxy resin, particularly epoxy resin because epoxy resin has high water resistance and mechanical strength.

Either before or after the initial calibration parameters are written, it is not necessary to store the rotation angle detecting unit with the power source input/output board mounted to the board external mounting portion. The rotation angle detecting unit can be assembled in the same manner until the initial calibration, irrespective of the specifications of the power source input/output board.

Preferably, the power source input/output board is stored while not being mounted to the board external mounting portion. In this state, it is possible to select and mount an optimum power source input/output board having a voltage stabilizing circuit with optimum specifications according to the specifications of the external power source. Thus, various types of rotation angle detecting units can be easily produced, each type in a small quantity.

Preferably, the rotation angle detecting unit is stored with the initial calibration parameters having been written. In this state, the rotation angle detecting unit can be manufactured simply by mounting the power source input/output board, so that various kinds of rotation angle detecting units can be manufactured quickly.

Preferably, the magnetic sensor comprises an integrated circuit in which a magnetic detecting element, a processor and a memory are incorporated, the circuit board carries only the magnetic sensor on one side thereof and is a circular member or a member having arcuately cut corners, and the board internal mounting portion is formed into a cylindrical recess having an inner periphery for radially positioning the circuit board. As used herein, "radial" and "axial" refer to the radial and axial directions of the shaft, respectively.

The magnetic drum and the magnetic sensor are positioned relative to the axis of the shaft. Thus by mounting only the magnetic sensor, which comprises the above integrated circuit, on one side of the circuit board, it is possible to circumferentially arrange the essential functional elements including the sensor power source connecting end, grounded end and signal line connecting end, so that the circuit board can be formed into a circle or into a shape in which the redundant corners are arcuately removed. By rounding the circuit board, it is possible to minimize the maximum width of the circuit board. Further, by forming the board internal mounting portion into a cylindrical recess having an inner periphery for radially positioning the circuit board, it is possible to minimize its inner diameter, which makes it possible to minimize the size of the lid and thus the size of the entire rotation angle detecting unit Specific individual structures according to the present invention can be used independently of each other or freely combined in any manner as long as the object of the present invention is achievable.

According to the present invention, the power source input/output board carrying the voltage stabilizing circuit for stably outputting use voltage can be mounted outside the housing, and the electricity transmission line is provided which extends from the sensor power source connecting end to the outside. Thus after the initial calibration parameters have been written into the magnetic sensor, use voltage can be stably supplied. Also, it is possible to stably mount the circuit board and to minimize the size of the entire rotation angle detecting unit.

DETAILED DESCRIPTION OF THE INVENTION

Now the rotation angle detecting unit of the first embodiment (hereinafter simply referred to as "the first embodiment"; ditto for the other embodiments) is described with reference to the drawings.

Figure 1:
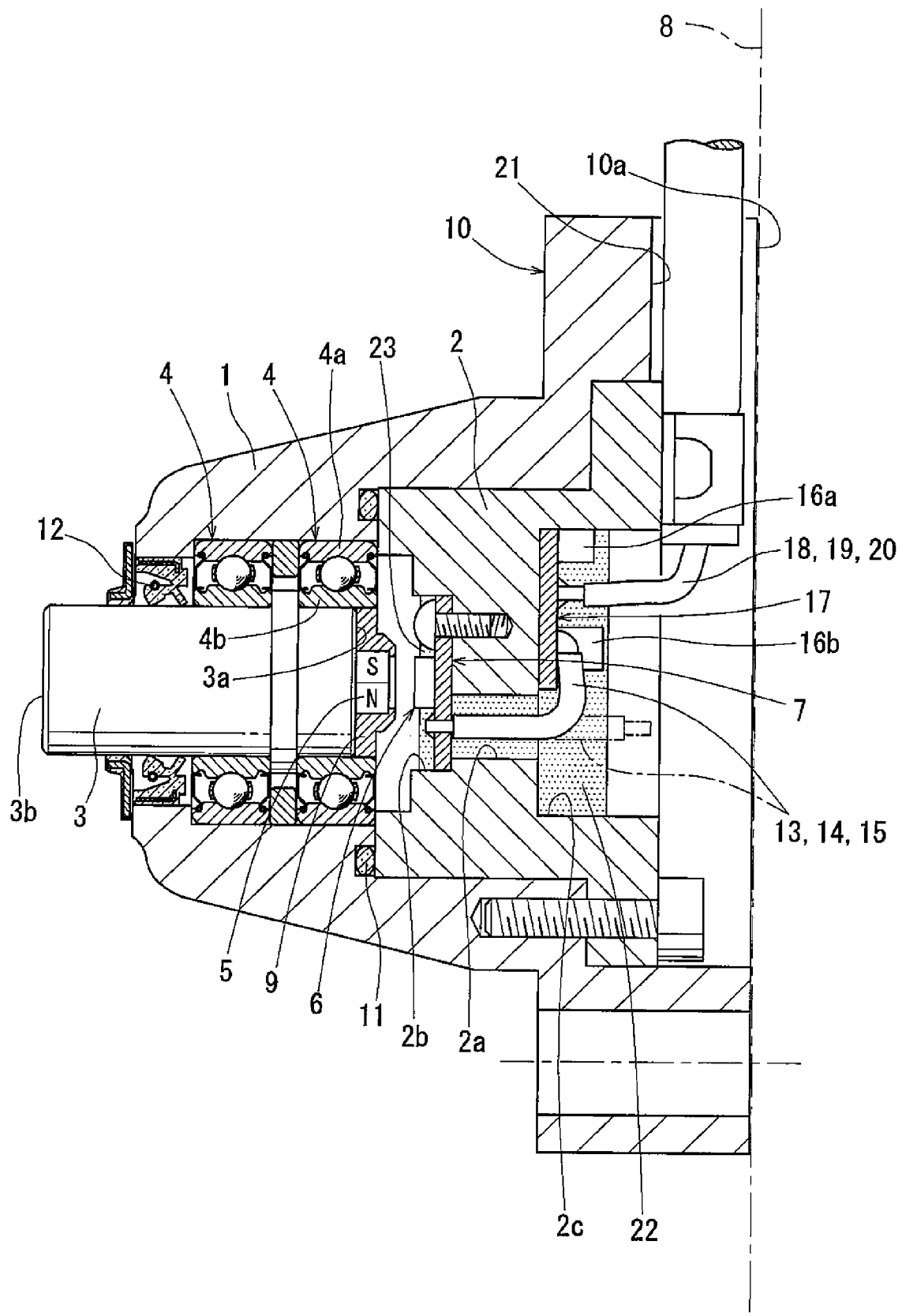
FIG. 1 is an entire sectional view of a first embodiment.

As shown in FIG. 1, the first embodiment comprises a housing 10 comprising a housing body 1 having mounting openings at first and second ends, respectively, and a lid 2 covering the mounting opening at the first end, a shaft 3 having an end surface 3a at the first end, which is located inside the housing 10, and an end surface 3b at the second end, which protrudes from the mounting opening at the second end, rolling bearings 4 rotatably supporting the shaft 3 on the housing body 1, a magnetic drum 5 fixed to the end surface 3a of the shaft 3 at the first end, a magnetic sensor 6 for detecting changes in magnetic flux as the magnetic drum 5 rotates and calculating the rotation angle, and a circuit board 7 carrying the magnetic sensor 6.

The housing 10 has a mounting flange at the first end which has a mounting surface 10a to which a mating member 8 is clamped. To the protruding end portion of the shaft 3, a second mating member (not shown) is coupled so that its angle relative to the mating member 8 can be measured.

The rolling bearings 4 are of the inner race rotating type and mounted between the shaft 3 and the housing body 1. These two rolling bearings 4 are held in position by the housing body 1 and the shaft 3 so as not to be movable in the radial direction and in one axial direction toward the second end. In this state, when the lid 2 is clamped and fixed to the housing body 1 from the first end, the clamp force is transmitted to one end surface of the outer race 4a of the rolling bearing 4 at the first end, thereby applying a preload to the two rolling bearings 4. In the embodiment, the surface of the lid 2 at the second end is in abutment with the end surface of the outer race 4a over the entire circumference. But instead, the outer race 4a may be pressed by the lid 2 through a spacer mounted between the end surface of the outer race 4a and the lid 2.

A seal member 11 seals between the housing body 1 and the lid 2. A seal member 12 seals between the mounting opening of the housing body 1 at the second end and the shaft 3.

With the sensor unit assembled in the above manner, an inner space is defined by the end surface 3a of the shaft 3, the rolling bearing 4 and the lid 2. In this inner space, the magnetic drum 5, magnetic sensor 6, circuit board 7, etc. are mounted.

The magnetic drum 5 has S-poles and N-poles alternately arranged in the circumferential direction around its axis, and is fixed to the shaft 3 so as to be coaxial with the shaft 3. Thus, as the shaft 3 rotates, the magnetic flux generated from the magnetic drum 5 changes.

The first embodiment includes a holder 9 made of a nonmagnetic material and holding the magnetic drum 5. The inner race 4b of the rolling bearing 4 at the first end can be mounted so as to protrude from the end surface 3a of the shaft 3 toward the first end of the housing body. By press-fitting the holder 9 into the protruding portion of the inner race 4b, the holder 9 and the magnetic drum 5, which is retained on the central portion of the holder 9, can be fixed in position relative to the end surface 3a of the shaft 3. Since the holder 9 can be fixed to the shaft 3 without the need for screws, there is no need to form screw holes and seating surfaces on the holder 9 and the end surface 3a of the shaft 3. This makes it possible to minimize the diameters of these members and thus the inner diameter of the rolling bearings 4, which in turn makes it possible to reduce the inner diameter of the housing body 1 and the outer diameter of the lid 2.

The magnetic sensor 6 is of a known type which detects the rotation angle based on changes in magnetic fluxes in two phases having a phase difference of 90° as the magnetic drum 5 rotates.

Figure 2:
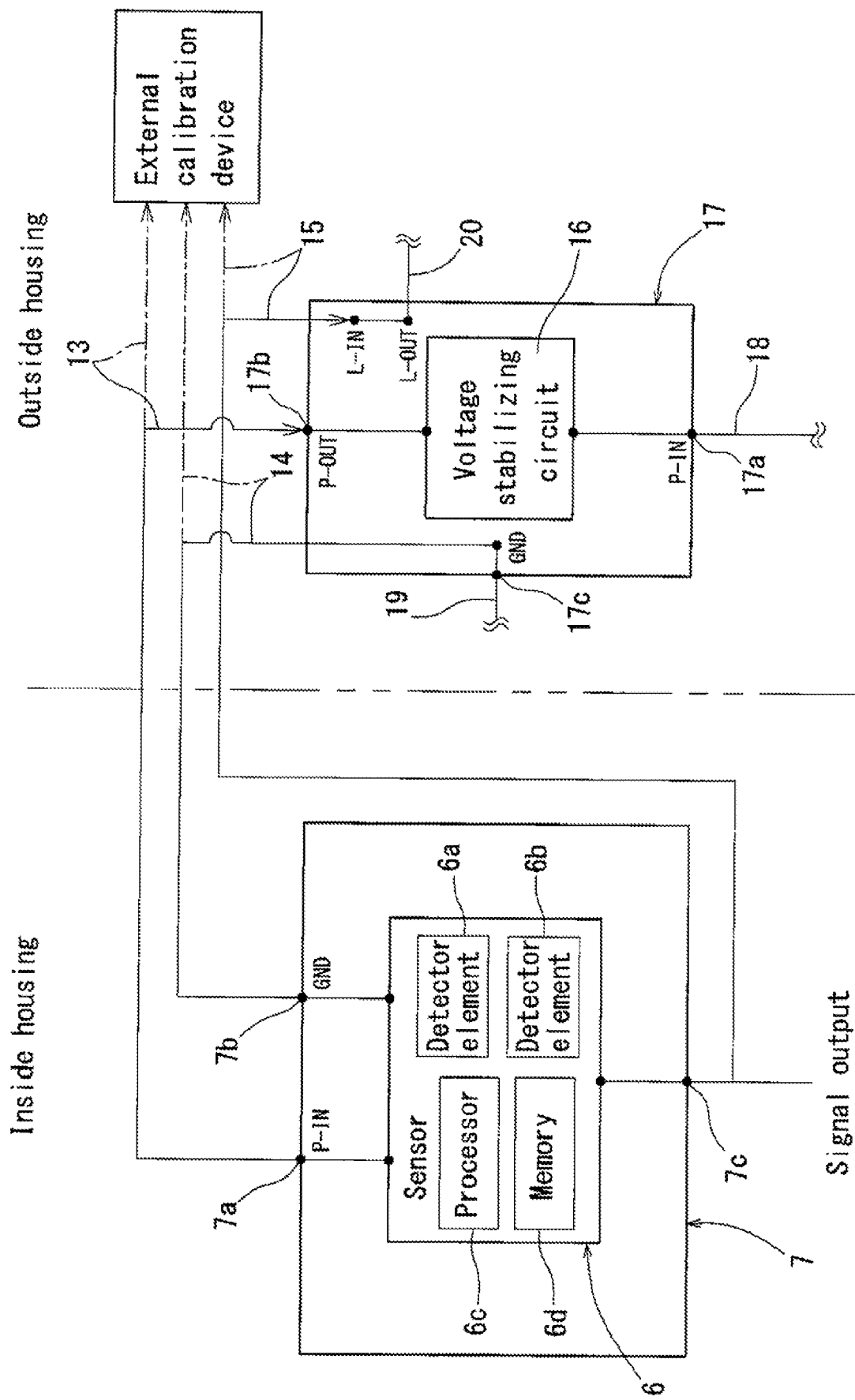
FIG. 2 is a circuit block diagram of a circuit board and a power source input/output board of the first embodiment.

As shown in FIG. 2, the magnetic sensor 6 is an integrated circuit comprising a magnetic detector element 6a and a magnetic detector element 6b which are displaced in phase by 90° for detecting phases A and B, respectively, a processor 6c, and a memory 6d. The memory 6d is a nonvolatile semiconductor memory and stores initial calibration parameters. The processor 6c calculates the rotation speed based on detection signals from the magnetic detector elements 6a and 6b, and corrects the thus calculated rotation speed based on the initial calibration parameters stored in the memory 6d. If the initial calibration parameters are not obtainable from the memory 6d, the processor calculates the rotation angle without correcting it.

The sensor power source connecting end 7a of the circuit board 7 is an input end for the magnetic sensor 6. A feed line 13 for feeding voltage for calibration is connected to the sensor power source connecting end 7a. As shown in FIGS. 1 and 2, the feed line 13 for feeding calibration voltage comprises a cable passed through a through hole 2a formed in the lid 2. With the lid 2 fixed to the housing body 1, the feed line 13 extends from the sensor power source connecting end 7a to the outside the housing.

The grounded end 7b of the circuit board 7 is a grounded end of the magnetic sensor 6. A ground line 14 is connected to the grounded end 7b so as to extend to the outside of the housing. The signal output end 7c of the circuit board 7 is a signal output end of the magnetic sensor 6. A signal transmission line 15 is connected to the signal output end 7c so as to extend to the outside of the housing.

For ease of handling, the ground line 14, the signal transmission line 15 and the calibration voltage feed line 13 are packed in a single common cable. But the calibration voltage feed line 13, ground line 14, etc. may be packed in separate cables.

Figure 3A:
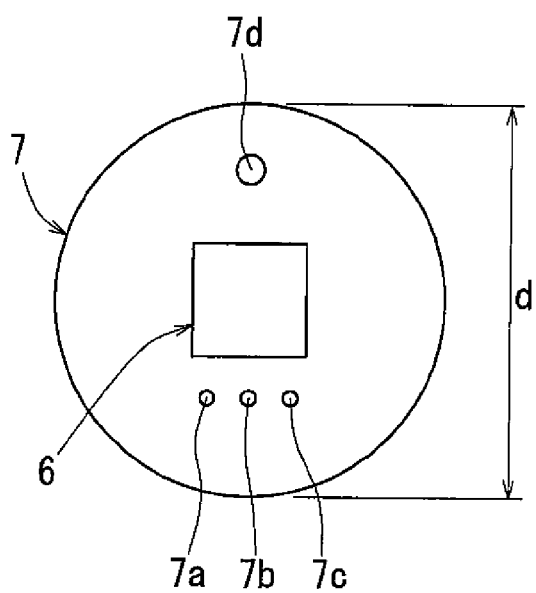
FIG. 3(a) is a plan view of the circuit board of the first embodiment.

The circuit board 7 carries only the magnetic sensor 6 on its surface at the second end. As shown in FIG. 3(a), the sensor power source connecting end 7a, the grounded end 7b, and the signal transmission end 7c are provided on one half of the circumference of the magnetic sensor 6, while a hole 7d for a screw is formed in the other half of the circumference of the magnetic sensor 6. By mounting the magnetic sensor 6 on the one side of the circuit board 7 with its essential components provided circumferentially spaced from each other, the circuit board 7 can be formed into a circle or into the shape shown in FIG. 3(b), in which the redundant four corners of an existing rectangular board, which is shown by one-dot chain line in FIG. 3(b), has been arcuately removed.

As shown in FIG. 1, on its surface at the second end, the lid 2 has a board internal mounting portion 2b for mounting the circuit board 7 therein. The board internal mounting portion 2b is a cylindrical recess in which the circuit board 7 is radially positioned. The board internal mounting portion 2b is located on the center of the surface of the lid 2 at the second end and recessed from the portion of the surface of the lid 2 pressed against the end surface of the outer race 4a toward the first end of the housing. The bottom of the board internal mounting portion 2b supports the surface of the circuit board 7 at the first end. The circuit board 7 can be screwed to the bottom of the board internal mounting portion 2b. The board internal mounting portion 2b may be formed separately from the lid 2.

With the magnetic drum 5 fixed to the end surface 3a of the shaft 3 and the circuit board 7 fixed to the board internal mounting portion 2b, by fixing the lid 2 to the housing body 1, the lid 2 presses the outer races 4a of the rolling bearings 4, thereby applying pre-load to the bearings 4. This determines the positional relationship between the housing body 1 and the shaft 3, thus positioning the magnetic sensor 6 relative to the magnetic drum 5. By fixing the lid 2 in position, the assembling error of the rotation angle detecting unit itself, which can influence the measurement results of the rotation angle, is determined.

As shown by one-dot chain lines in FIGS. 1 and 2, with the lid 2 fixed in position, the calibration voltage feed line 13, ground line 14 and signal transmission line 15 extend to the outside. The external connecting end of the calibration voltage feed line 13 is connected to an external calibration device. Thus, with calibration voltage supplied to the magnetic sensor 6 through the calibration voltage feed line 13, it is possible to write initial calibration parameters in the memory 6d from the external calibration device.

The initial calibration parameters may include a parameter for correcting measurement error due to variation in sensor sensitivity. Variation in sensor sensitivity may be corrected by eliminating any sensor that is out of the standard by measuring it with a tester before mounting it to the housing. But it is more convenient to correcting such variation in sensor sensitivity based on the initial calibration parameter.

Outside the housing body 1, a board external mounting portion 2c is provided to which a power source input/output board 17 including a voltage stabilizing circuit 16 for stabilizing use voltage can be mounted.

The power source input end 17a of the power source input/output board 17 is an input end of the voltage stabilizing circuit 16. The stabilizing output end 17b of the power source input/output board 17 is an output end of the voltage stabilizing circuit 16. The power source input end 17a can be connected to an unstable external power source (not shown) of e.g. a generator of e.g. a construction or an industrial machine through an external input line 18 at any time.

The voltage stabilizing circuit 16 is a known one including a power source stabilizing element 16a and a resistor 16b, and capable of stabilizing the voltage supplied to the power source input end 17a and outputting it as a use voltage.

As shown by solid lines in FIGS. 1 and 2, the external connecting end of the calibration voltage feed line 13 can be connected to the stabilizing output end 17b after writing the initial calibration parameters.

The external grounded end 17c of the power source input/output board 17 is connected through an external ground line to the ground, which is also connected to the power source input end 17a.

As shown by solid lines in FIGS. 1 and 2, the ground line 14 is connected to a circuit (not shown) of an external device such as a construction machine in which the measured rotation angle is used through the power source input/output board 17 and the external ground line 19. As shown by solid lines in FIGS. 1 and 2, the signal transmission line 15 is connected to a control circuit, a monitoring circuit, etc. of the external device through the power source input/output board 17 and an external signal line 20. By connecting the ground line 14 and the signal transmission line 15 to the power source input/output board 17, it is possible to improve workability because the length of the ground line passing through the hole 2a is short, and to improve handling by enclosing the external input line 18, external ground line 19 and external signal line 20 in a single cable. The ground line 14 may be directly connected to the external ground, and the signal transmission line 15 may be directly connected to the external device.

After writing the initial calibration parameters, by connecting the power source input end 17a of the power source input/output board 17 to the output end of the external power source through the external input line 18, connecting the external grounded end 17c to the external ground through the external ground line 19, and connecting the stabilizing output end 17b to the external connecting end of the calibration voltage feed line 13, it is possible to stably feed use voltage to the sensor power source connecting end 7a of the circuit board 7 using the calibration voltage feed line 13.

The board external mounting portion 2c is provided on the surface of the lid at the first end. The board external mounting portion 2c is located nearer to the axis than is the mounting surface 10a of housing body 1 and is recessed toward the second end. The surface of the power source input/output board 17 at the second end is supported by the bottom of the board external mounting portion 2c. The voltage stabilizing circuit 16 is mounted on the surface of the power source input/output board 17 at its first end. The power source input/output board 17 may be screwed to the bottom of the board external mounting portion 2c. The board external mounting portion 2c may be a separate member from the lid 2.

The through hole 2a is formed in the recess of the board external mounting portion 2c. The power source input/output board 17 can be mounted to the board external mounting portion 2c at its portion displaced from the through hole 2a. Thus, after writing the initial calibration parameters, the power source input/output board 17 can be mounted either before or after the calibration voltage feed line 13, the ground line 14, etc. are connected.

The board external mounting portion 2c is deep enough that the power source input/output board 17 and the magnetic sensor 6, which is mounted thereto, are received therein. When the mounting surface 10a is clamped against the mating member 8, with the power source input/output board 17, which carries the magnetic sensor 6, mounted to the board external mounting portion 2c, the board external mounting portion 2c is closed except a cable port 21 extending from the board external mounting portion 2c to the outside. The external input line 18, external ground line 19 and external signal line 20 extend through the cable port 21 to the outside. The cable port 21 is defined by a radial wiring groove formed in the surface of the housing body 1 at its first end so as to be recessed toward the second end from the mounting surface 10a, and the portion of the mounting surface of the mating member 8 covering the radial groove. Instead, the cable port 21 may be a through hole extending between the radially inner and outer surfaces of the housing body 1. In the embodiment shown, the mounting surface 10a and the mounting surface of the mating member 8 are radial flat surfaces. But provided that the board external mounting portion can be closed in the above manner, these surfaces may not be flat surfaces.

Since the board external mounting portion 2c is recessed, the live part of the power input/output board 17 can be easily coated with resin. As shown in FIG. 1, the live part of the power input/output board 17 and the through hole 2a formed in the board external mounting portion 2c are protected by a common resin coating layer 22.

The live part of the circuit board 7 is protected by a resin coating layer 23.

Each of the live part of the circuit board 7 and the live part of the power source input/output board 17 is preferably coated with at least one of silicon resin, urethane resin and epoxy resin. These live parts are conductive parts comprising exposed portions of e.g. the soldered portions and terminals.

Since the interior of the housing 10, in which the circuit board 7 is mounted, is sealed by seals 11 and 12, the resin coating layer 23 does not have to be water-resistant. The housing 10 can ordinarily shield light if it is made of e.g. steel, resin or aluminum. Thus the resin coating layer 23 does not have to be weather-resistant either. Thus, as the material for the resin coating layer 23, it is possible to use at least one of silicon and foamed urethane resins, which are more vibration-resistant than epoxy resin, which tends to harden.

The resin coating layer 22, which is located outside the housing 10, may be exposed to sunlight and rainwater and also may contact external objects and receive external force therefrom. Thus preferably, the resin coating layer 22 is made of epoxy resin, which has higher mechanical strength and is more water-resistant and weather-resistant than silicon and urethane resins.

In the first embodiment, with the lid 2 fixed in position, it is possible to supply calibration voltage to the sensor power source connecting end 7a of the circuit board 7, and to write the initial calibration parameters, using the calibration voltage feed line 13. Then, by connecting the external connecting end of the calibration voltage feed line 13 and the stabilizing output end 17b of the power source input/output board at the outside, it is possible to stably supply use voltage to the sensor power source connecting end 7a, thereby measuring the relative rotation angle between the housing 10 and the shaft 3.

In the first embodiment, since the power source input/output board 17 and the circuit board 7 are separate members, it is possible to minimize the inner space defined by the shaft 3, rolling bearings 3 and the lid 2, and thus to minimize the size of the entire rotation angle detecting unit. In the first embodiment, since the voltage stabilizing circuit 16 is not mounted on the surface of the circuit board 7 at the first end, it is possible to maximize the support area of the bottom of the board internal mounting portion 2b, thus preventing the circuit board 7 from being unstably mounted.

In the first embodiment, since the circuit board 7 carries all their components only on one side thereof, the circuit board can be screwed to the bottom of the board internal mounting portion 2b while preventing the circuit board from being unstably mounted.

In the first embodiment, since the through hole 2a is formed in the lid 2, which is provided with the board internal mounting portion 2b, and the calibration voltage feed line is a cable passing through the through hole 2a, the calibration voltage feed line can be provided simply by passing the calibration voltage feed line 13 connected to the circuit board 7 through the through hole 2a of the lid 2 when mounting the circuit board 7 to the board internal mounting portion 2b.

In the first embodiment, the housing 10 has the mounting surface 10a at the first end which is to be clamped against the mating member 8, the board external mounting portion 2c is formed on the housing at its first end so as to be located radially inwardly of the mounting surface 10a and recessed toward the other end from the mounting surface 10a. Thus, with the power source input/output board 17 received in the board external mounting portion 2c, it is possible to clamp the mounting surface 10a against the mating member 8, thereby closing the board external mounting portion 2c with the mounting surface 10a and the mating member 8. Thus, in the first embodiment, it is possible to protect e.g. the power source input/output board 17 from the outside without adding a separate dedicated cover.

In the first embodiment, since the power source input/output board 17 can be mounted at a position displaced from the through hole 2a, with the power source input/output board 17 mounted to the bottom of the board external mounting portion 2c beforehand, it is possible to connect the external connecting ends of cables passed through the through holes 2a, such as the calibration voltage feed line 13 to e.g. the stabilizing output end 17b of the power source input/output board 17. Thus in the first embodiment, it is possible to easily mount the power source input/output board and easily connect e.g. the calibration voltage feed line 13 to the power source input/output board 17.

In the first embodiment, since the power source input/output board 17 can be mounted at a position displaced from the through hole 2a, and the live part of the power source input/output board 17 and the through hole 2a are protected by the common resin coating layer, it is not necessary to carry out resin coating steps separately for these portions. Since the through hole 2a is open to the outside of the housing 10, the through hole is preferably closed by a sufficiently water-resistant and weather-resistant resin. The through hole 2a may be closed by the same resin as the resin for the power source input/output board 17 for which the same properties are required.

In the first embodiment, it is possible to fill resin into the through hole 2a with the through hole 2a closed by the circuit board 7.

Figure 4:
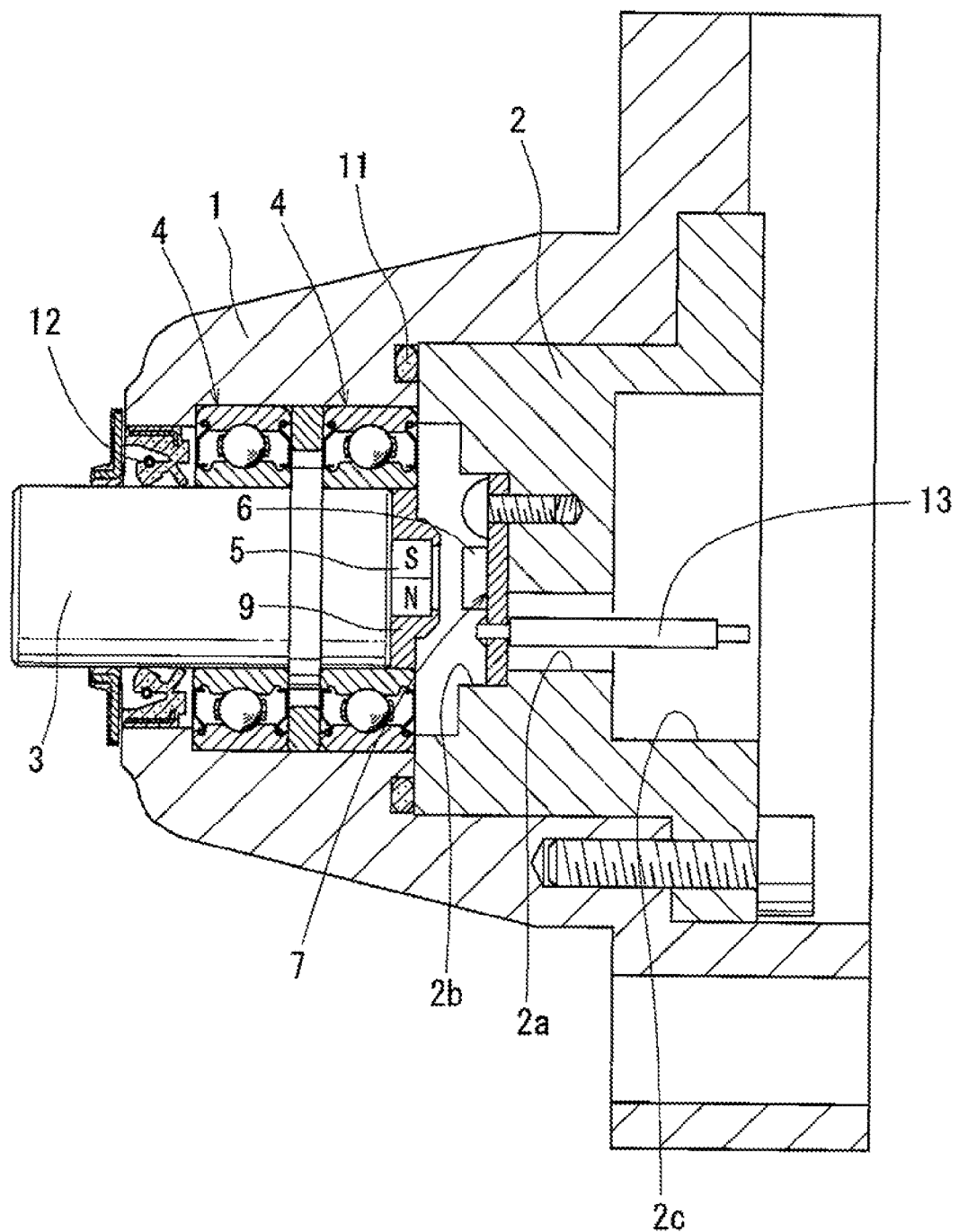
FIG. 4 is an entire sectional view of the first embodiment during storage.

In the first embodiment, since the power source input/output board 17 can be mounted to the outside of the housing 10, as shown in FIG. 4, the power source input/output board 17 can be stored without being mounted to the board external mounting portion 2c. This makes it possible to select and mount an optimum power source input/output board with a voltage stabilizing circuit according to the specifications of the external power source to be connected to the power source input end 17a of the power source input/output board 17. Thus in the first embodiment, various kinds of rotation angle detecting units can be easily produced, each type in a small quantity, of which the voltage stabilizing circuits and power input/output boards differ in specifications from each other.

Since e.g. the calibration voltage feed line 13 can be connected to the power source input/output board 17 after the lid 2 has been fixed and the initial calibration parameters have been written, the first embodiment can be stored with the initial calibration parameters written. Thus, the rotation angle detecting unit can be manufactured simply by mounting the power source input/output board 17 to the first embodiment stored in the above manner. It is thus possible to shorten the time to shipment by the time necessary to write the initial calibration parameters, which in turn makes it possible to quickly manufacture various types of rotation angle detecting units.

If the first embodiment is stored for a long period of time, in order to protect the interior of the housing 10, it may be stored with only the through hole 2a sealed with e.g. resin beforehand.

Figure 3B:
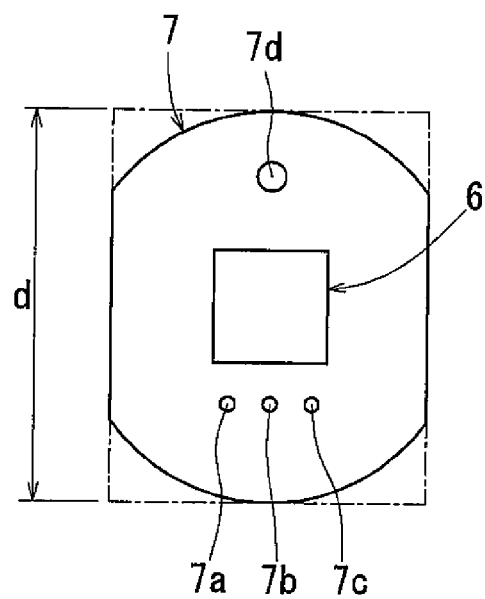
FIG. 3(b) is a plan view of a modified example of FIG. 3(a).

In the first embodiment, as shown in FIGS. 1, 3(a) and 3(b), since the magnetic sensor 6 is an integrated circuit, the circuit board 7 carries only the magnetic sensor 6 on the central part of one side thereof, the circuit board 7 has its perimeter rounded, and the cylindrical recessed board internal mounting portion 2b is provided for radially positioning the circuit board 7, it is possible to minimize the maximum width d of the circuit board 7 for the sensor, and minimize the inner diameter of the board internal mounting portion 2b, which in turn makes it possible to minimize the diameter of the surface of the lid 2 at the second end, thereby minimizing the diameter of the housing body 1.

Figure 5:
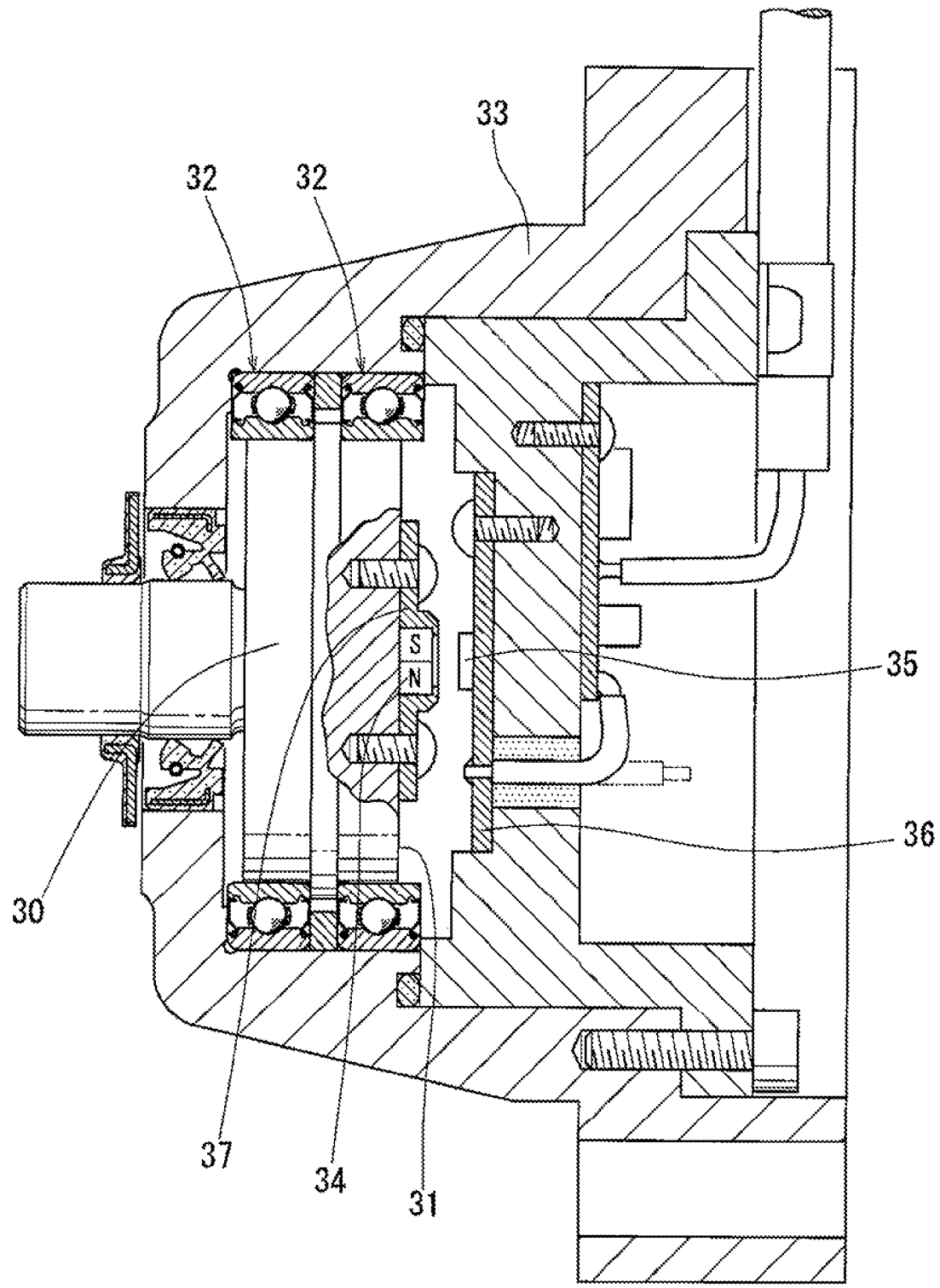
FIG. 5 is an entire sectional view of a second embodiment.

Now the second embodiment is described. Here, only what differs from the first embodiment is described. As shown in FIG. 5, the shaft 30 is a stepped shaft having a large-diameter end surface 31 at the first end. Thus, the rolling bearings 32 have larger inner and outer diameters and the housing body 33 also has a larger diameter. Since the shaft 30 and the rolling bearings have large diameters, the second embodiment has higher rigidity, which reduces the possibility of shifting of the magnetic drum 34 and the magnetic sensor 35 relative to each other when loads act on the shaft 30. Since the end surface 31 of the shaft has a large diameter, the circuit board 36 and the flange of the holder 37 have longer outer circumferences, which makes it possible to screw the holder 37 to the end surface 31 at a plurality of locations.

The present invention is not limited to the first and second embodiments, and the embodiments can be modified as long as the object of the invention is achievable.

What is claimed is:

1. A rotation angle detecting unit comprising a housing including a housing body having mounting openings at first and second ends thereof, respectively, and a lid covering the mounting opening at the first end, a shaft having its portion at the first end received in the housing and its portion at the second end protruding from the mounting opening of the housing at the second end, a rolling bearing rotatably supporting the shaft on the housing body, a magnetic drum fixed to an end surface of the shaft at the first end, a magnetic sensor for detecting change in magnetic flux as the magnetic drum rotates, and calculating a relative rotation angle based on the change in magnetic flux, and a circuit board carrying the magnetic sensor, wherein a board internal mounting portion is provided on a surface of the lid at the second end for mounting the circuit board, wherein the lid is configured to apply a preload to the rolling bearing by pressing an outer race of the rolling bearing and to position the magnetic sensor relative to the magnetic drum when the lid is fixed in position, wherein initial calibration parameters are configured to be written into the magnetic sensor while calibration voltage which is higher than use voltage is being supplied through a sensor power source connecting end of the circuit board, wherein a board external mounting portion is provided outside the housing to which a power source input/output board with a stabilizing circuit for stably outputting use voltage can be mounted, the rotation angle detecting unit further comprising a calibration voltage feed line extending from the sensor power source connecting end to the outside with the lid fixed in position, the calibration voltage feed line having an external connecting end which can be connected to a stabilizing output end of the power source input/output board after the initial calibration parameters have been written.

2. The rotation angle detecting unit of claim 1 wherein the calibration voltage feed line comprises a cable extending through a through hole formed in the lid, and wherein the board external mounting portion is provided on a surface of the lid at the first end.

3. The rotation angle detecting unit of claim 2 wherein the housing has a mounting surface at the first end which is configured to be clamped against a mating member, wherein the board external mounting portion is located radially inwardly of the mounting surface and recessed from the mounting surface toward the second end, and wherein the through hole is formed in the recess of the board external mounting portion, whereby the board external mounting is closed when the mounting surface is clamped against the mating member, except a cable port extending from the board external mounting portion to the outside.

4. The rotation angle detecting unit of claim 2 wherein the power source input/output board can be mounted to the board external mounting portion at its part displaced from the through hole.

5. The rotation angle detecting unit of claim 4 wherein a live part of the circuit board and the through hole are protected by the same resin coating layer.

6. The rotation angle detecting unit of claim 1 wherein the live part of the circuit board and a live part of the power source input/output board are each coated with at least one of silicon resin, urethane resin and epoxy resin.

7. The rotation angle detecting unit of claim 6 wherein the live part of the circuit board is coated with at least one of silicon resin and urethane resin, and the live part of the power source input/output board is coated with at least one of urethane resin and epoxy resin.

8. The rotation angle detecting unit of claim 1 wherein the power source input/output board is stored while not being mounted to the board external mounting portion.

9. The rotation angle detecting unit of claim 8 which is stored with the initial calibration parameters having been written.

10. The rotation angle detecting unit of claim 1 wherein the magnetic sensor comprises an integrated circuit in which a magnetic detecting element, a processor and a memory are incorporated, wherein the circuit board carries only the magnetic sensor on one side thereof and is a circular member or a member having arcuately cut corners, and wherein the board internal mounting portion is formed into a cylindrical recess having an inner periphery for radially positioning the circuit board.

11. The rotation angle detecting unit of claim 3 wherein the power source input/output board can be mounted to the board external mounting portion at its part displaced from the through hole.

12. The rotation angle detecting unit of claim 2 wherein the live part of the circuit board and a live part of the power source input/output board are each coated with at least one of silicon resin, urethane resin and epoxy resin.

13. The rotation angle detecting unit of claim 3 wherein the live part of the circuit board and a live part of the power source input/output board are each coated with at least one of silicon resin, urethane resin and epoxy resin.

14. The rotation angle detecting unit of claim 4 wherein the live part of the circuit board and a live part of the power source input/output board are each coated with at least one of silicon resin, urethane resin and epoxy resin.

15. The rotation angle detecting unit of claim 5 wherein the live part of the circuit board and a live part of the power source input/output board are each coated with at least one of silicon resin, urethane resin and epoxy resin.

16. The rotation angle detecting unit of claim 2 wherein the power source input/output board is configured to be stored while not being mounted to the board external mounting portion.

17. The rotation angle detecting unit of claim 3 wherein the power source input/output board is configured to be stored while not being mounted to the board external mounting portion.

18. The rotation angle detecting unit of claim 4 wherein the power source input/output board is configured to be stored while not being mounted to the board external mounting portion.

19. The rotation angle detecting unit of claim 2 wherein the magnetic sensor comprises an integrated circuit in which a magnetic detecting element, a processor and a memory are incorporated, wherein the circuit board carries only the magnetic sensor on one side thereof and is a circular member or a member having arcuately cut corners, and wherein the board internal mounting portion is formed into a cylindrical recess having an inner periphery for radially positioning the circuit board.

20. The rotation angle detecting unit of claim 6 wherein the magnetic sensor comprises an integrated circuit in which a magnetic detecting element, a processor and a memory are incorporated, wherein the circuit board carries only the magnetic sensor on one side thereof and is a circular member or a member having arcuately cut corners, and wherein the board internal mounting portion is formed into a cylindrical recess having an inner periphery for radially positioning the circuit board.

* * * * *